United States Patent
Krishnamurthy et al.

(10) Patent No.: US 9,609,399 B2
(45) Date of Patent: Mar. 28, 2017

(54) AUTOMATIC REPORTING OF PROGNOSIS DATA FROM WIRELESS MESH SENSORS TO CLOUD

(71) Applicant: Honeywell International Inc., Morristown, NJ (US)

(72) Inventors: Divyashree Krishnamurthy, Karnataka (IN); Asha Samaga, Bangalore (IN); Vidhya Thawale, Karnataka (IN); Malathy Rajkumar, Karnataka (IN); Manjunatha Divakara, Karnataka (IN); Sushil Sharma, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/709,552

(22) Filed: May 12, 2015

(65) Prior Publication Data
US 2016/0337720 A1    Nov. 17, 2016

(51) Int. Cl.
*G08C 15/06*    (2006.01)
*G08C 19/20*    (2006.01)
(Continued)

(52) U.S. Cl.
CPC ............. *H04Q 9/00* (2013.01); *H04L 67/10* (2013.01); *H04W 84/18* (2013.01); *H04Q 2209/40* (2013.01)

(58) Field of Classification Search
CPC ...... H04Q 9/00; H04Q 2209/40; H04L 67/10; H04W 84/18
See application file for complete search history.

(56) References Cited

U.S. PATENT DOCUMENTS

2005/0078672 A1 * 4/2005 Caliskan ................. H04L 45/42
370/389
2006/0190458 A1 * 8/2006 Mishina ................ H04L 67/125
(Continued)

FOREIGN PATENT DOCUMENTS

EP    2 637 147 A1    9/2013

OTHER PUBLICATIONS

Extended European search report from corresponding EP patent application 16166748.0, dated Sep. 22, 2016.
(Continued)

*Primary Examiner* — Erin File
(74) *Attorney, Agent, or Firm* — Husch Blackwell LLP

(57) ABSTRACT

A apparatus is provided that includes a plurality of wireless sensors arranged into a mesh network, wherein each of the plurality of sensors detects threats within a secured geographic area, a processor of each of the plurality of sensors that detects operational and environmental operating conditions of a respective one of the plurality of sensors and reports the operational and environmental operating conditions, a control panel processor that receives and correlates at least one of the operational and environmental operating conditions of the respective one of the plurality of sensors to a potential failure mode and reports the potential failure mode to a cloud application, and a cloud processor of the cloud application that determines a location of the respective one of the plurality of sensors and reports the potential failure mode and the location to a person responsible for the respective one of the plurality of sensors.

20 Claims, 1 Drawing Sheet

(51) Int. Cl.
*H04Q 9/00* (2006.01)
*H04L 29/08* (2006.01)
*H04W 84/18* (2009.01)

(56) References Cited

U.S. PATENT DOCUMENTS

| | | | |
|---|---|---|---|
| 2009/0058639 A1* | 3/2009 | Tanaka | G01D 21/00 340/539.22 |
| 2014/0135998 A1* | 5/2014 | Cao | F24F 11/0012 700/278 |
| 2015/0097664 A1 | 4/2015 | Breed et al. | |
| 2015/0188671 A1* | 7/2015 | Distasi | H04L 1/189 370/336 |
| 2016/0043827 A1* | 2/2016 | Filson | H04K 3/22 370/252 |

OTHER PUBLICATIONS

English-language translation of abstract for EP 2 637 147 A1, dated Sep. 11, 2013.

* cited by examiner

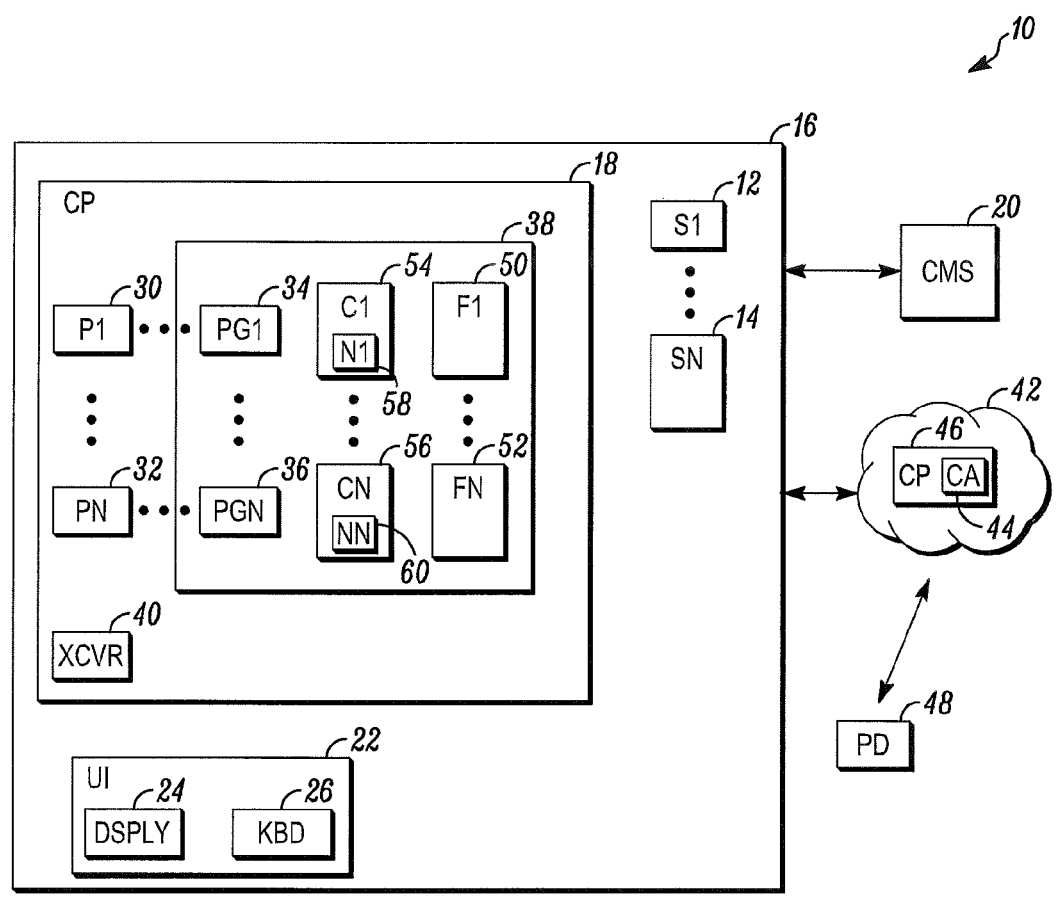

AUTOMATIC REPORTING OF PROGNOSIS DATA FROM WIRELESS MESH SENSORS TO CLOUD

FIELD

This application relates to security systems and, more particularly, to wireless sensors used within such systems.

BACKGROUND

Systems are known to protect people and assets within secured areas. Such systems are typically based upon the use of one or more wireless sensors that detect threats within the secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

While conventional security systems using wireless sensors work well, they are sometimes subject to unexpected failures. Accordingly, a need exists for better methods and apparatuses for diagnosing such systems.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 depicts a security system 10 shown generally in accordance with an illustrated embodiment. Included within the security system may be a number of sensors 12, 14 used for detecting threats within a secured geographic area 16. Threats may originate from any of a number of different sources. For example, an intruder may represent a threat to people and/or assets within a home or business. Similarly, a fire or a gas leak may threaten the safety of those same people and/or assets.

Accordingly, the sensors may be embodied in any of a number of different forms. For example, at least some of the sensors may be switches placed on the doors and windows providing entry into and egress from the secured area. Other sensors may be passive infrared (PIR) sensors placed within the secured area in order to detect intruders who have been able to circumvent the sensors along the periphery of the secured area. Still other of the sensors may be smoke and/or fire detectors.

Also included within the secured area is a control panel or controller 18. The control panel may be located within the secured area as shown in FIG. 1 or located remotely.

The control panel may monitor the sensors for activation. Upon activation of one of the sensors, the control panel may compose an alarm message and send it to a central monitoring station 20. The central monitoring station may respond by summoning the appropriate help (e.g., police, fire department, etc.).

The security system may be controlled by a human user through a user interface 22. Included within the user interface may be a display 24 and a keyboard 26.

Located within the control panel, the user interface, and each of the sensors may be one or more processor apparatuses (processors) 30, 32 each operating under control of one or more computer programs 34, 36 loaded from a non-transitory computer readable medium (memory) 38. As used herein, reference to a step performed by a computer program is also reference to the processor that executed that step.

The security system may be armed and disarmed through the user interface. In this regard, an authorized user may enter a personal identification number (PIN) and an instruction through the keyboard. The instruction may be an arm instruction, an arm away instruction, and/or a disarm command.

A status processor may monitor the user interface for input from the human user. Upon detecting a PIN, the status processor may compare the entered PIN with the PINs of authorized users. If the entered PIN matches the PIN of an authorized user, then the status processor executes the instruction. If not, then the input may be ignored, or an error message is generated.

In the armed state, an alarm processor monitors each of the sensors for activation. Upon detecting activation of one of the sensors, the alarm processor composes and sends an alarm message to the central monitoring station. The alarm message may include an identifier of the system (e.g., account number, street address, etc.), an identifier of the sensor, and the time of activation.

In general, the sensors of FIG. 1 are wireless devices that communicate with the control panel on one or more radio frequency channels. Accordingly, a respective radio frequency transceiver 40 located within the control panel and each of the sensors is provided in support of such wireless communication.

For example, the control panel may include one or more communication processors that define a super frame for communication between the control panel and sensors. The super frame, in turn, may be defined by a number of time division multiple access (TDMA) slots that re-occur over a predetermined time period. Some of the slots may be reserved for use by the sensors under a 6LowPan/IPv6/IoT protocol.

The super frame may include a slot reserved for a beacon and slots reserved for the exchange of messages between the sensors and the control panel under an IEEE 802.15.4 and/or 6LowPAN protocol. The beacon may identify a starting point of the super frame and incorporate a number of data fields that define respective aspects of the super frame.

Each sensor of the system of FIG. 1 may have a short address, an IPv6 (6LowPan) address, and a MAC identifier (MAC ID). The addressing system facilitates accessing of the sensors by any other IPv6 compatible device as described in various Internet of Things (IoT) publications. This allows the sensors to be arranged by respective processors into star or tree networks.

The status of the control panel (e.g., armed, disarmed, trouble, etc.) may be carried as part of the beacon payload. If necessary, a detailed indicator of panel status may also be carried within respective slots under the 6LowPAN/802.15.4 protocols. The control slots of the beacon may also be used to send request messages from the control panel to end devices (e.g., sensors, etc.) based upon the IEEE802.15.4 addresses of the end devices.

Under one illustrated embodiment, a monitoring processor of the control panel monitors a number of internal operational and environmental aspects of each sensor for indications of potential failure. This may be accomplished via a reporting system within each of the sensors that collects and periodically reports on a number of reliability indicators of the sensor. This may be accomplished via a reporting processor within the sensor that automatically collects and periodically sends the indicators to the control panel, or the monitoring processor of the control panel may periodically poll each of the sensors for the reliability indicators.

The reliability indicators may be provided from any of a number of different sources within each sensor. For example, one source may be a voltage monitoring processor that monitors a battery voltage of the sensor. Another source may be a signal strength processor that monitors a power level of packets transmitted by the sensor to the panel either directly or through another of the sensors. Still another source may be one or more counter processors that count the number of packets that are transmitted and received per time period (e.g., per hour, per day, etc.). In this regard, one counter processor may count the number of packets that originate from within the sensor and that are exchanged with the control panel. Another counter processor may count the number of packets that are exchanged with the control panel on behalf of a child sensor of the mesh network.

Another source may be a link quality processor that monitors a link quality of the communication channel between the sensor and panel. The link quality processor may monitor the number of errors over some time period as a measure of the quality of the communication link between the sensor and panel.

Still another source of reliability information may be provided by a temperature sensing processor within the sensor. In this case, the temperature sensing processor may be coupled to a sensing element that detects and measures a temperature of the processors of the sensor.

Under the illustrated embodiment, the reporting processor of each sensor may collect such reliability indicators (e.g., temperature, link quality, transmission power, number of packets transmitted per time period, etc.) and transmit these values to the monitoring processor of the control panel. The reported indicators from each sensor may be saved in a respective file 50, 52. The monitoring processor or one more related processor may compare the reliability indicators with a number of criteria 54, 56 to identify one or more potential failure modes for the sensor reporting the indicators.

Upon detecting a potential failure mode, the monitoring processor may send a corresponding notification 58, 60 associated with the criteria to a cloud application 44 through the Internet 42. The cloud application, in turn, may report the potential failure mode to a portable device 48 of a person responsible for the sensor.

In this regard, the cloud application may include one or more computer programs executing on a processor apparatus (processor) 46. Similarly, the portable device of the responsible person may be a smartphone.

The notification sent to the responsible person may be determined by the type of failure mode involved. Included with the notification is an identifier of the sensor by location and a time. The identification of the sensor may be based upon a geographic location of the sensor and/or security system (e.g., an address of the security system, GPS location, etc.). Alternatively or in addition, the notification may include a separate identifier and/or a GPS location of the sensor within the secured area.

The notifications and criteria are formatted for the potential failure involved. For example, one notification of a potential failure may be a prediction of battery failure or low battery level based upon the number of packets transmitted and received by the sensor. In this case, the criteria may be based upon a threshold level of packets that may be transmitted and received per time period.

The situation where a sensor transmits and receives too many packets during a time period may be caused by any of a number of different factors. For example, a sensor in a mesh network may be located in a central location where a number of child sensors must rely on the centrally located sensor in order to communicate with the control panel. However, this may result in an early battery failure of the centrally located sensor that is disproportionate with the surrounding sensors.

In order to address this particular potential failure mode, one of the criteria may compare the number of packets exchanged on behalf of a child node with a child node threshold value. If a sensor exceeds the threshold value, then an appropriate notification may be sent to the responsible person. The notification may include a notice that the sensor is in danger of battery failure because of excessive child node packet activity and the suggestion that the sensors in the area should be relocated to reduce the child node activity through the sensor.

Another criteria may be based upon the transmitted signal power level of each sensor. For example, a steep and consistent decrease in signal strength can be detected by the panel and flagged for a low signal strength notification. In this case, a low signal strength indication is of greater value than a low battery voltage level because it is a much earlier indication of impending battery failure.

Another criteria may be based upon a measured or detected sensor temperature. In this case, a steep and continuous increase in temperature can be an indicator that the sensor is too close to an external heat source or that the sensor processor is malfunctioning either because of a software glitch or hardware failure. High temperature is a likely indication of impending sensor failure. In this case, the notification sent may be a high temperature warning for the sensor.

Another criteria may be based upon the quality level of the radio frequency link between the sensor and control panel. In this case, the criteria may simply be a link quality threshold value. In this case, poor link quality may be caused by poor sensor location and by an incompatibility of the sensor with its location. For example, the sensor may be located behind a metal post or other conductive structure. The notification in this case may include the suggestion that the sensor should be moved to a better location.

Each of the conditions of potential failure may be reported by the panel to the cloud. The cloud receives a notification of the potential failure along with the GPS location of the panel and may notify installers who may be working near the panel premises for their immediate attention. The cloud application may send a notification to an authorized user, sensor dealer, or other responsible person, including an indication of the reason for the sensor failure, potential failure, battery draining condition, environmental issues, or malfunction along with the criticality of the situation. If the responsible person is a dealer, then the dealer can call the end-user and advise the end-user as to the maintenance activity needed to avoid false alarm penalties that would otherwise be incurred due to a faulty sensor.

In general, the system includes a plurality of wireless sensors arranged into a mesh network, wherein each of the plurality of wireless sensors detects threats within a secured geographic area, a processor of each of the plurality of wireless sensors that detects internal operational conditions of a respective one of the plurality of wireless sensors and reports the internal operational conditions, a control panel processor that receives and correlates at least one of the internal operational conditions of the respective one of the plurality of wireless sensors to a potential failure mode and reports the potential failure mode to a cloud application, and a cloud processor of the cloud application that determines a location of the respective one of the plurality of wireless sensors and reports the potential failure mode and the location to a person responsible for the respective one of the plurality of wireless sensors.

Alternatively, the system includes a plurality of wireless sensors arranged into a mesh network, wherein each of the plurality of wireless sensors detects threats within a secured geographic area, a processor of each of the plurality of wireless sensors that detects internal operational conditions of a respective one of the plurality of wireless sensor and reports the internal operational conditions to a control panel, a control panel processor that receives and correlates at least one of the internal operational conditions of the respective one of the plurality of wireless sensors to a potential failure mode and reports the potential failure mode to a cloud application, and a cloud processor of the cloud application that determines a location of the respective one of the plurality of wireless sensors and reports the potential failure mode and the location to a person responsible for the respective one of the plurality of wireless sensors.

Alternatively, the system includes a security system that protects a secured area, a plurality of wireless sensors of the security system arranged into a mesh network, wherein each of the plurality of wireless sensors detects threats within the secured area, a control panel of the security system that monitors each of the plurality of wireless sensors, a processor of each of the plurality of wireless sensors that detects internal operational conditions of a respective one of the plurality of wireless sensors and reports the internal operational conditions to the control panel, a control panel processor that receives and correlates at least one of the internal operational conditions of the respective one of the plurality of wireless sensors to a potential failure mode and reports the potential failure mode to a cloud application, and a cloud processor of the cloud application that determines a location of the respective one of the plurality of wireless sensors and reports the potential failure mode and the location to a person responsible for the respective one of the plurality of wireless sensors.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figure do not require the particular order shown or sequential order to achieve desirable results. Other steps may be provided, steps may be eliminated from the described flows, and other components may be added to or removed from the described embodiments.

The invention claimed is:

1. An apparatus comprising:
   a wireless sensor, wherein the wireless sensor detects threats within a secured geographic area;
   a processor of the wireless sensor that detects internal operational conditions of the wireless sensor and reports the internal operational conditions;
   a control panel processor that receives and correlates the internal operational conditions of the wireless sensor to a potential failure mode and reports the potential failure mode to a cloud application; and
   a cloud processor of the cloud application that determines a location of the wireless sensor and reports the potential failure mode and the location to a person responsible for the wireless sensor.

2. The apparatus as in claim 1 wherein the control panel processor comprises a control panel that monitors a plurality of sensors that includes the wireless sensor.

3. The apparatus as in claim 2 wherein the control panel processor polls each of the plurality of sensors for data.

4. The apparatus as in claim 2 wherein the plurality of sensors comprises one or more of smoke detectors, carbon monoxide detectors, and intrusion detectors.

5. The apparatus as in claim 1 further comprising a counter within the wireless sensor that determines a number of times that the wireless sensor has transmitted data.

6. The apparatus as in claim 2 further comprising a counter within the wireless sensor that determines a number of times that the wireless sensor has re-transmitted data from other ones of the plurality of sensors.

7. The apparatus as in claim 1 wherein the processor of the wireless sensor determines and reports a temperature of the wireless sensor.

8. The apparatus as in claim 1 wherein the processor of the wireless sensor determines and reports a transmission power of the wireless sensor.

9. An apparatus comprising:
   a wireless sensor, wherein the wireless sensor detects threats within a secured geographic area;
   a processor of the wireless sensor that detects internal operational conditions of the wireless sensor and reports the internal operational conditions to a control panel;
   a control panel processor that receives and correlates the internal operational conditions of the wireless sensor to a potential failure mode and reports the potential failure mode to a cloud application; and
   a cloud processor of the cloud application that determines a location of the wireless sensor and reports the potential failure mode and the location to a person responsible for the wireless sensor.

10. The apparatus as in claim 9 wherein the internal operational conditions reported to the control panel further comprise one or more of a number of times that the wireless sensor has transmitted data to the control panel, a number of times that the wireless sensor has re-transmitted data from a plurality of sensors that includes the wireless sensor to the control panel, a battery voltage, a temperature of the wireless sensor, and a transmission power.

11. The apparatus as in claim 10 wherein the control panel processor correlates the temperature of the wireless sensor with the potential failure mode.

12. The apparatus as in claim 11 wherein the control panel processor correlates a rate of rise of the temperature of the wireless sensor with the potential failure mode.

13. The apparatus as in claim 10 wherein the control panel processor correlates the number of times that the wireless sensor has transmitted data with the potential failure mode.

14. The apparatus as in claim 10 wherein the control panel processor correlates the transmission power with the potential failure mode.

15. The apparatus as in claim 14 wherein the control panel processor correlates a rate of decrease in the transmission power with the potential failure mode.

16. The apparatus as in claim 9 wherein the control panel processor polls each of a plurality of sensors that includes the wireless sensor for data.

17. The apparatus as in claim 16 wherein the plurality of sensors comprises one or more of smoke detectors, carbon monoxide detectors, and intrusion detectors.

18. An apparatus comprising:
a security system that protects a secured area;
a wireless sensor of the security system, wherein the wireless sensor detects threats within the secured area;
a control panel of the security system that monitors the wireless sensor;
a processor of the wireless sensor that detects internal operational conditions of the wireless sensor and reports the internal operational conditions to the control panel;
a control panel processor that receives and correlates the internal operational conditions of the wireless sensor to a potential failure mode and reports the potential failure mode to a cloud application; and
a cloud processor of the cloud application that determines a location of the wireless sensor and reports the potential failure mode and the location to a person responsible for the wireless sensor.

19. The apparatus as in claim 18 wherein the internal operational conditions reported to the control panel comprise one or more of a number of times that the wireless sensor has transmitted data to the control panel, a number of times that the wireless sensor has re-transmitted data from a plurality of sensors that includes the wireless sensor to the control panel, a battery voltage, a temperature of the wireless sensor, and a transmission power.

20. The apparatus as in claim 18 wherein the control panel processor compares the internal operational conditions or rate of rise or decrease of the internal operational conditions with a corresponding threshold value.

* * * * *